United States Patent [19]
Pfaendner et al.

[11] Patent Number: 5,807,966
[45] Date of Patent: Sep. 15, 1998

[54] INCREASE IN MOLECULAR WEIGHT OF POLYCONDENSATES

[75] Inventors: Rudolf Pfaendner, Rimbach; Heinz Herbst, Lautertal; Kurt Hoffmann, Wachenheim, all of Germany

[73] Assignee: Ciba Specialty Chemicals Corporation, Tarrytown, N.Y.

[21] Appl. No.: 765,015
[22] PCT Filed: Jun. 9, 1995
[86] PCT No.: PCT/EP95/02231
§ 371 Date: Dec. 19, 1996
§ 102(e) Date: Dec. 19, 1996
[87] PCT Pub. No.: WO95/35343
PCT Pub. Date: Dec. 28, 1995

[30] Foreign Application Priority Data

Jun. 22, 1994 [CH] Switzerland ............... 1991/94-6

[51] Int. Cl.$^6$ ............... C08G 63/87; C08G 69/48
[52] U.S. Cl. ............... 528/286; 528/487; 521/48; 524/126; 525/420
[58] Field of Search ............... 528/487, 286; 524/126; 521/48; 525/419, 420

[56] References Cited

U.S. PATENT DOCUMENTS

| | | | |
|---|---|---|---|
| 3,509,107 | 4/1970 | Brignac | 524/151 |
| 3,551,548 | 12/1970 | Brignac et al. | 525/420 |
| 3,763,113 | 10/1973 | Burrows et al. | 524/125 |
| 4,107,138 | 8/1978 | Hofer et al. | 524/126 |
| 4,263,230 | 4/1981 | Uhing | 524/126 |
| 4,906,708 | 3/1990 | Bhattacharjee et al. | 528/487 |
| 5,063,265 | 11/1991 | Harris | 524/126 |
| 5,116,919 | 5/1992 | Buzinkai et al. | 528/487 |
| 5,225,526 | 7/1993 | Fukawa et al. | 524/126 |
| 5,298,541 | 3/1994 | Bohshar et al. | 524/126 |

FOREIGN PATENT DOCUMENTS

| | | |
|---|---|---|
| 0158501 | 10/1985 | European Pat. Off. |
| 0251711 | 1/1988 | European Pat. Off. |
| 0295906 | 12/1988 | European Pat. Off. |
| 0410230 | 1/1991 | European Pat. Off. |
| 91/17209 | 6/1991 | WIPO |
| 9117209 | 11/1991 | WIPO |

OTHER PUBLICATIONS

Chem Abst. 91,124534.
Kunststaffe 74 (1984), 218 ff.
Kunstrstaffe 82 (1992), 284 ff.

Primary Examiner—Tae Yoon
Attorney, Agent, or Firm—Luther A. R. Hall; Victoria M. Malia

[57] ABSTRACT

An increase in the molecular weight of virgin polycondensates and polycondensate recyclates can be achieved by heating to above the melting point or glass transition temperature and by the addition of diphosphonite.

16 Claims, No Drawings

INCREASE IN MOLECULAR WEIGHT OF POLYCONDENSATES

The present invention relates to a process for increasing the molecular weight of polycondensates and to the polycondensates obtainable by said process.

Polycondensates as exemplified by polyester, polyamide and polycarbonates are important engineering plastics having many different utilities, e.g. as foils, bottles, fibres and injection moulding parts. These polymers have in common that they are prepared by polycondensation reactions. The damage done to such polycondensates by processing and use results mainly in polymer fragments containing functional end groups, as a consequence of chain cleavage reactions.

The mechanical and physical properties depend essentially on the molecular weight of the polymer. Reduced molecular weight makes possible only a limited high-quality recycling of used polyesters, polyamides, polycarbonates and production waste, typically generated from fibre production and injection moulding, without carrying out an aftertreatment.

It is generally known to enhance the material properties of used polycondensates, i.e. polyamides damaged by heat or hydrolysis. Typically these polycondensates can be postcondensated in the solid state (S. Fakirov, Kunststoffe 74 (1984), 218 and R. E. Grützner, A. Koine, Kunststoffe 82 (1992), 284). However, this method is time consuming and is, moreover, highly sensitive to the impurities that may be present in waste material.

EP-0 410 230 also proposes the use of phosphoric acid, phosphorous acid or phosphonous acid as catalyst for the solid phase condensation of polyamides.

F. Mitterhofer describes investigations using a diphosphonite as processing stabiliser for polymer recyclates (C.A. 91, 124534).

It is also commonly known to obtain crosslinked polyamides by using an epoxy resin and a standard polyamide catalyst, preferably sodium hypophosphite (EP-A-0 295 906). The crosslinked polyamides obtainable in this manner typically have a melt viscosity which is the four times higher than that of the starting polyamide.

Accordingly, it is the object of this invention to provide a process that makes it possible to increase the molecular weight of polycondensates, e.g. polyesters, polyamides and polycarbonates as well as the corresponding copolymers and blends in a relatively short time. In this process, the increase of the molecular weight shall essentially be effected without crosslinking.

Surprisingly, it has been found possible to increase the molecular weight of the polycondensate substantially by fusing and adding at least one diphosphonite or a mixture of at least one diphosphonite and at least one difunctional compound to a polycondensate. This molecular weight increase effects an enhancement of the properties of the polycondensates, e.g. in injection moulding and, in particular, of recyclates. With the process of this invention it is possible to achieve an increase in the molecular weight of, in particular, polycondensate recyclates originating from the collection of used technical parts, as from automotive and electric utilities, which makes it possible to employ the recyclates for their original utilities. Such recyclates originate also from, inter alia, industrial or domestic useful material collections, production wastes or obligatory returnables.

Accordingly, the invention relates to a process for increasing the molecular weight of polyamides, essentially without crosslinking, which comprises heating a polyamide or a copolymer or a blend thereof, with the addition of at least one diphosphonite to above the melting point (in the case of crystalline polyamides) or to above the glass transition temperature (in the case of amorphous polyamides) of the polymer.

Another aspect of the invention is a process for increasing the molecular weight of polycondensate recyclates, essentially without crosslinking, which comprises heating a polyamide recyclate, a polyester recyclate or a copolymer or a blend recyclate of these polymers, with the addition of at least one diphosphonite to above the melting point (in case of crystalline polycondensate types) or to above the glass transition temperature (in case of amorphous polycondensate types) of the polymer.

The invention also relates to a process for increasing the molecular weight of polycondensates, essentially without crosslinking, which comprises heating a polyamide, a polyester, a polycarbonate or a copolymer or a blend of these polymers with the addition of at least one diphosphonite and at least one difunctional compound selected from the class of the diepoxides, bismaleimides, tetracarboxylic dianhydrides, bisoxazolines, bisoxazines, bisacyl lactams or diisocyanates to above the melting point (in the case of crystalline polycondensate types) or to above the glass transition temperature (in the case of amorphous polycondensate types) of the polycondensate.

In addition to polyester, polyamide or polycarbonate, this invention also comprises the corresponding copolymers and blends, e.g. PBT/PS, PBT/ASA, PBT/ABS, PET/ABS, PET/PC, PBT/PET/PC, PBT/PET, PA/PP and PA/ABS, as well as mixtures of virgin plastic and recyclate.

Polyamides, ie. virgin polyamides as well as polyamide recyclates, will be understood as meaning aliphatic and aromatic polyamides or copolyamides that are derived from diamines and dicarboxylic acids and/or from aminocarboxylic acids or the corresponding lactams. Illustrative examples of suitable polyamides are:

PA 6, PA 11, PA 12, PA 46, PA 66, PA 69, PA 610, PA 612, as well as amorphous polyamides of the Trogamid PA 6-3-T and Grilamid TR 55 types. Polyamides of the indicated kind are commonly known and commercially available.

The preferred polyamides in the practice of this invention are PA 6 and PA 6.6 or mixtures thereof, as well as recyclates based thereon.

The polyester, i.e. virgin polyester as well as polyester recyclate, may be homopolyesters or copolyesters that are derived from aliphatic, cycloaliphatic or aromatic dicarboxylic acids and diols or hydroxycarboxylic acids.

The aliphatic dicarboxylic acids may contain from 2 to 40 carbon atoms, the cycloaliphatic dicarboxylic acids from 6 to 10 carbon atoms, the aromatic dicarboxylic acids from 8 to 14 carbon atoms, the aliphatic hydroxycarboxylic acids from 2 to 12 carbon atoms, and the aromatic as well as the cycloaliphatic hydroxycarboxylic acids from 7 to 14 carbon atoms.

The aliphatic diols may contain from 2 to 12 carbon atoms, the cycloaliphatic diols from 5 to 8 carbon atoms and the aromatic diols from 6 to 16 carbon atoms.

Aromatic diols will be taken to mean those in which two hydroxyl groups are bonded to one aromatic hydrocarbon radical or to different aromatic hydrocarbon radicals.

The polyesters may also be branched with minor amounts, typically 0.1 to 3 mol %, based on the dicarboxylic acids, of more than difunctional monomers (e.g. pentaerythritol, trimellitic acid, 1,3,5-tri(hydroxyphenyl)benzene, 2,4-dihydroxybenzoic acid or 2-(4-hydroxyphenyl)-2-(2,4-dihydroxyphenyl)propane).

If the polyesters are based on at least 2 monomers, said monomers may be randomly distributed, or they may be block copolymers.

Suitable dicarboxylic acids are linear and branched saturated aliphatic dicarboxylic acids, aromatic dicarboxylic acids and cycloaliphatic dicarboxylic acids.

Suitable aliphatic dicarboxylic acids are those containing from 2 to 40 carbon atoms, typically oxalic acid, malonic acid, dimethylmalonic acid, succinic acid, pimelic acid, adipic acid, trimethyladipic acid, sebacic acid, azelaic acid and dimer acids (dimerisation products of unsaturated aliphatic carboxylic acids such as oleic acid), alkylated malonic and succinic acids such as octadecylsuccinic acid.

Suitable cycloaliphatic dicarboxylic acids are:
1,3-cyclobutanedicarboxylic acid, 1,3-cyclopentanedicarboxylic acid, 1,3- and 1,4-cyclohexanedicarboxylic acid, 1,3- and 1,4-(dicarboxylmethyl)cyclohexane, 4,4'-dicyclohexyldicarboxylic acid.

Suitable aromatic dicarboxylic acids are:
preferably terephthalic acid, isophthalic acid, o-phthalic acid, as well as 1,3-, 1,4-, 2,6- or 2,7-naphthalenedicarboxylic acid, 4,4'-diphenyldicarboxylic acid, 4,4'-diphenylsulfonecarboxylic acid, 4,4'-benzophenonedicarboxylic acid, 1,1,3-trimethyl-5-carboxyl-3-(p-carboxylphenyl)indane, 4,4'-diphenyl ether dicarboxylic acid, bis-p-(carboxylphenyl)methane or bis-p-(carboxylphenyl)ethane.

The aromatic dicarboxylic acids are preferred, including in particular terephthalic acid and isophthalic acid.

Further suitable dicarboxylic acids are those that contain —CO—NH— groups and which are disclosed in DE-A 2 414 349. Dicarboxylic acids that contain N-heterocyclic rings are also suitable, for example those that are derived from carboxylalkylated, carboxylphenylated or carboxybenzylated monoamine-s-triazinedicarboxylic acids (q.v. DE-A 2 121 184 and 2 533 675), mono- or bishydantoins, benzimidazolenes or halogenated benzimidazolenes or parabanic acid. The carboxyalkyl groups may contain from 3 to 20 carbon atoms.

Suitable aliphatic diols are the linear and branched aliphatic glycols, preferably those containing from 2 to 12, most preferably from 2 to 6, carbon atoms in the molecule, typically including:
ethylene glycol, 1,2- and 1,3-propylene glycol, 1,2-, 1,3-, 2,3- or 1,4-butanediol, pentyl glycol, neopentyl glycol, 1,6-hexanediol, 1,12-dodecanediol. A suitable cycloaliphatic diol is conveniently 1,4-dihydroxycyclohexane. Further suitable aliphatic diols are typically 1,4-bis(hydroxymethyl)cyclohexane, aromatic-aliphatic diols such as p-xylylene glycol or 2,5-dichloro-p-xylylene glycol, 2,2-(β-hydroxyethoxyphenyl)propane, as well as polyoxyalkylene glycols such as diethylene glycol, triethylene glycol, polyethylene glycol or polypropylene glycol. The alkylene diols are preferably linear and preferably contain 2 to 4 carbon atoms.

Preferred diols are the alkylene diols, 1,4-dihydroxycyclohexane and 1,4-bis(hydroxymethyl)cyclohexane. Ethylene glycol and 1,4-butanediol are especially preferred.

Further suitable aliphatic diols are the β-hydroxyalkylated, preferably β-hydroxyethylated, bisphenols such as 2,2-bis[4'-(β-hydroxyethoxy)phenyl]propane. Further bisphenols are mentioned hereinafter.

A further group of suitable aliphatic diols comprises the heterocyclic diols disclosed in German Offenlegungsschrift specifications 1 812 003, 2 342 432, 2 342 372 and 2 453 326. Illustrative examples are:
N,N'-bis(β-hydroxyethyl-5,5-dimethyl)hydantoin, N,N'-bis(β-hydroxypropyl-5,5-dimethyl)hydantoin, methylenebis[N-(β-hydroxyethyl)-5-methyl-5-ethylhydantoin], methylenebis[N-(β-hydroxyethyl)-5,5-dimethylhydantoin], N,N'-bis(β-hydroxyethylbenzylimidazolone, -(tetrachloro)benzimidazolone or -(tetrabromo)benzimidazolone.

Suitable aromatic diols are mononuclear diphenols and, preferably, dinuclear diphenols which carry a hydroxyl group at each aromatic nucleus. By aromatic are meant preferably aromatic hydrocarbon radicals such as phenylene or naphthylene. In addition to e.g. hydroquinone, resorcinol or 1,5-, 2,6 and 2,7-dihydroxynaphthalene, those bisphenols merit special mention that may be illustrated by the following formulae:

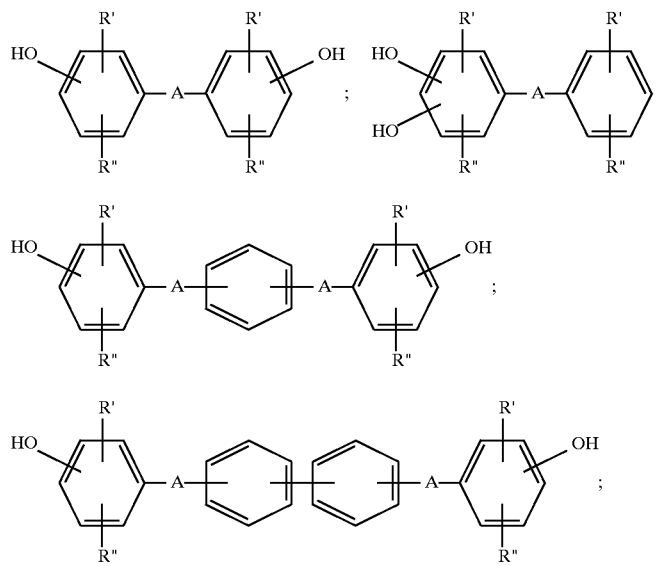

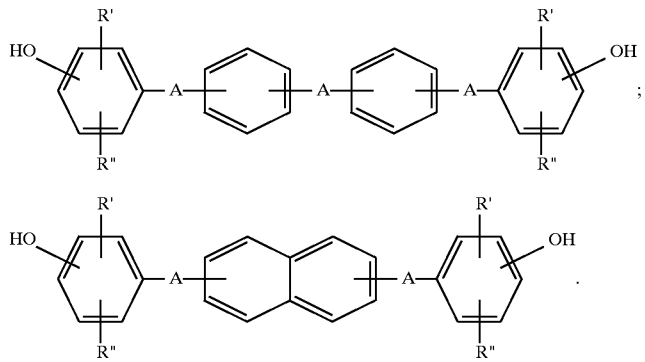

The hydroxyl groups may be in m-position, but are preferably in p-position. R' and R" in this formula may be alkyl of 1 to 6 carbon atoms, halogen such as chloro or bromo and, in particular, hydrogen atoms. A may be a direct bond or —O—, —S—, —(O)S(O)—, —C(O)—, —P(O)($C_1$–$C_{20}$alkyl)—, unsubstituted or substituted alkylidene, cycloalkylidene or alkylene.

Unsubstituted or substituted alkylidene is exemplified by: ethylidene, 1,1- or 2,2-propylidene, 2,2-butylidene, 1,1-isobutylidene, pentylidene, hexylidene, heptylidene, octylidene, dichloroethylidene, trichloroethylidene.

Illustrative examples of unsubstituted or substituted alkylene are methylene, ethylene, phenylmethylene, diphenylmethylene, methylphenylmethylene. Illustrative examples of cycloalkylidene are cyclopentylidene, cyclohexylidene, cycloheptylidene and cyclooctylidene.

Illustrative examples of bisphenols are:

bis(p-hydroxyphenyl) ether or thioether, bis(p-hydroxyphenyl)sulfone, bis(p-hydroxyphenyl) methane, bis(4-hydroxyphenyl)-2,2-biphenyl, phenylhydroquinone, methylhydroquinone, trimethylhydroqinone, 1,2-bis(p-hydroxyphenyl) ethane, 1-phenyl-bis(p-hydroxyphenyl)methane, diphenyl-bis(p-hydroxyphenyl)methane, diphenyl-bis(p-hydroxyphenyl)-methane, bis(3,5-dimethyl-4-hydroxyphenyl)sulfone, bis(3,5-dimethyl-4-hydroxyphenyl)-p-diisopropylbenzene, bis(3,5-dimethyl-4-hydroxyphenyl)-m-diisopropylbenzene, 2,2-bis(3',5'-dimethyl-4'-hydroxyphenyl)propane, 1, 1- or 2,2-bis(p-hydroxyphenyl)butane, 2,2-bis(p-hydroxyphenyl)hexafluoropropane, 1,1-dichloro- or 1,1,1-trichloro-2,2-bis(p-hydroxyphenyl)ethane, 1,1-bis(p-hydroxyphenyl)cyclopentane and, preferably, 2,2-bis(p-hydroxyphenyl)propane (bisphenol A) and 1,1-bis(p-hydroxyphenyl)cyclohexane (bisphenol C).

Suitable polyesters of hydroxycarboxylic acids typically include polycaprolactone, polypivalolactone or the polyesters of 4-hydroxycyclohexanecarboxylic acid or 4-hydroxybenzoic acid.

Also suitable are polymers containing mainly ester bonds, but also other bonds, such as polyester amides or polyester imides.

Polyesters with aromatic dicarboxylic acids have achieved the greatest importance, in particular the polyalkylene terephthalates. Inventive moulding materials are therefore preferred in which the polyester is comprised of at least 30 mol %, preferably of at least 40 mol %, of aromatic dicarboxylic acids, and of at least 30 mol %, preferably of at least 40 mol %, of alkylenediols containing preferably 2 to 12 carbon atoms, based on the polyester.

Especially in this case the alkylenediol is linear and contains 2 to 6 carbon atoms and is exemplified by ethylene, trimethylene, tetramethylene or hexamethylene glycol and the aromatic dicarboxylic acid is terephthalic and/or isophthalic acid.

Particularly suitable polyesters are PET, PBT and corresponding copolymers or blends such as PBT/PC, PBT/ASA, PBT/ABS, PET/ABS, PET/PC or also PBT/PET/PC. PET and the copolymers thereof as well as PBT blends are particularly preferred.

Polycarbonate (PC) will be taken to mean virgin polycarbonate as well as polycarbonate recyclate. Polycarbonate (PC) is typically obtained from bisphenol A and phosgene or a phosgene analog such as trichloromethylchloroformate, triphosgene or diphenylcarbonate, in the last mentioned case by condensation, usually by the addition of a suitable transesterification catalyst, such as a boron hydride, an amine such as 2-methylimidazole or a quaternary ammonium salt. In addition to bisphenol A, other additional bisphenol components may be used, and also monomers which may be halogenated in the benzene nucleus. Particularly suitable bisphenol components that merit mention are:

2,2-bis(4'-hydroxyphenyl)propane (bisphenol A), 2,4'-dihydroxydiphenylmethane, bis(2-hydroxyphenyl) methane, bis(4-hydroxyphenyl)methane, bis(4-hydroxy-5-propylphenyl)methane, 1,1-bis(4'-hydroxyphenyl)ethane, bis(4-hydroxyphenyl) cyclohexylmethane, 2,2-bis(4'-hydroxyphenyl)-1-phenylpropane, 2,2-bis(3',5'-dimethyl-4'-hydroxyphenyl)propane, 2,2-bis(3',5'-dibromo-4'-hydroxyphenyl)propane, 2,2-bis(3',5'-dichloro-4'-hydroxyphenyl)propane, 1,1-bis(4'-hydroxyphenyl) cyclododecane, 1,1-bis(3',5'-dimethyl-4'-hydroxyphenyl)cyclododecane, 1,1-bis(4'-hydroxyphenyl)-3,3,5-trimethylcyclohexane, 1,1-bis(4'-hydroxyphenyl)--3,3,5,5-tetramethylcyclohexane, 1,1-bis(4'-hydroxyphenyl)-3,3,5-trimethylcyclopentane and the bisphenols indicated above. Furthermore, the polycarbonates may also be branched by suitable amounts of more than difunctional monomers (examples are as indicated above).

The polycondensate copolymers or blends which may be used in the novel process are prepared in conventional manner from the starting polymers. The polyester component is preferably PBT and PET, and the PC component is preferably a PC based on bisphenol A. The ratio of polyester to PC is preferably from 95:5 to 5:95. Particularly preferred is a ratio in which one component constitutes at least 70%.

The invention is of particular importance with respect to polycondensate recyclates recovered from production waste, useful material collections, or the obligatory returnables originating from, inter alia, the automotive industry or the electrical sector. The polycondensate recyclates are damaged by heat and/or hydrolysis in a wide variety of ways. Furthermore, these recyclates may also contain minor amounts of plastics of different structure such as polyolefins, polyurethanes, ABS or PVC. In addition, these recyclates may also contain as standard impurities, for example, paint residues, contact media or paint systems, metal traces, water traces, fuel residues, or inorganic salts. In the case of blends or mixtures, the compatibility may be enhanced by the addition of compatibilisers.

Diphosphonites according to this invention can be illustrated by formula

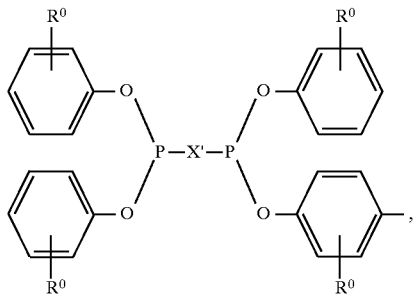

wherein R° is one to five $C_1$–$C_8$ alkyl radicals; X' is a radical

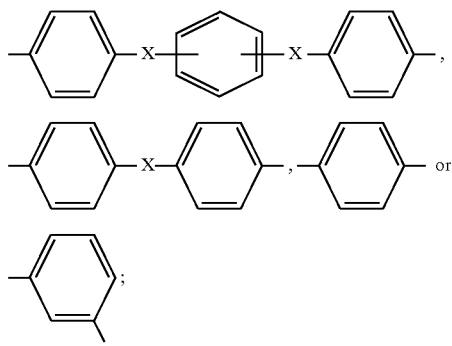

and X is a direct bond, —(O)S(O)—, —C(O)—, —S—, —O— or arylene.

Arylene is typically naphthylene, m-phenylene or p-phenylene.

R° is, in particular, one to three tert-butyl groups or one to three methyl groups. X' is, in particular, a radical

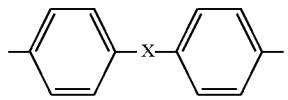

and particularly preferred a 4,4'-biphenylene radical.

Tetrakis(2,4-di-tert-butylphenyl)-4,4'-biphenylenediphosphonite (Irgafos® PEPQ) is very particularly preferred.

It is preferred to use 0.01 to 5 parts, more preferably 0.05 to 2 parts, of a diphosphonite, based on 100 parts of polycondensate.

Difunctional compounds of the class of the diepoxides according to this invention may have an aliphatic, aromatic, cycloaliphatic, araliphatic or heterocyclic structure. They contain epoxy groups as side groups or these groups form part of an alicyclic or heterocyclic ring system. The epoxy groups are preferably linked to the residual molecule as glycidyl groups through ether or ester bonds, or they are N-glycidyl derivatives of heterocyclic amines, amides or imides. Epoxy resins of these types are commonly known and commercially available.

The epoxy resins contain two epoxy radicals, typically those of formula

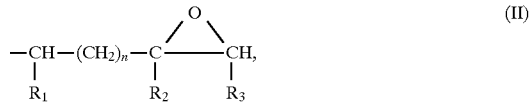

which radicals are linked direct to carbon, oxygen, nitrogen or sulfur atoms, wherein $R_1$ and $R_3$ are both hydrogen, $R_2$ is hydrogen or methyl, and n=0, or wherein $R_1$ and $R_3$, taken together, are —$CH_2$—$CH_2$— or —$CH_2$—$CH_2$—$CH_2$—, in which case $R_2$ is hydrogen and n=0 or 1.

Illustrative examples of epoxy resins are:

I) Diglycidyl and di(β-methylglycidyl) esters which are obtainable by reacting a compound containing two carboxyl groups in the molecule and epichlorohydrin or glycerol dichlorohydrin or β-methyl epichlorohydrin. The reaction is conveniently carried out in the presence of a base.

Compounds containing two carboxyl groups in the molecule may suitably be aliphatic dicarboxylic acids. Exemplary of these dicarboxylic acids are glutaric acid, adipic acid, pimelic acid, suberic acid, azelaic acid, sebacic acid or dimerised or trimerised linoleic acid.

Cycloaliphatic dicarboxylic acids may also be used, for example tetrahydrophthalic acid, 4-methyltetrahydrophthalic acid, hexahydrophthalic acid or 4-methylhexahydrophthalic acid.

Aromatic dicarboxylic acids may also be used, including phthalic acid or isophthalic acid.

II) Diglycidyl or di(β-methylglycidyl) ethers which are obtainable by reacting a compound containing two free alcoholic hydroxyl groups and/or phenolic hydroxyl groups in the molecule with a suitably substituted epichlorohydrin under alkaline conditions or in the presence of an acid catalyst and subsequent treatment with an alkali.

Ethers of this type are typically derived from acyclic alcohols such as ethylene glycol, diethylene glycol and higher poly(oxyethylene) glycols, 1,2-propanediol, or poly(oxypropylene) glycols, 1,3-propanediol, 1,4-butanediol, poly(oxytetramethylene) glycols, 1,5-pentanediol, 1,6-hexanediol, sorbitol, as well as from polyepichlorohydrins.

They may also be derived from cycloaliphatic alcohols such as 1,3- or 1,4-dihydroxycyclohexane, bis(4-hydroxycyclohexyl)methane, 2,2-bis(4-hydroxycyclohexyl) propane or 1,1-bis(hydroxymethyl)cyclohex-3-ene, or they contain aromatic nuclei, such as N,N-bis(2-hydroxyethyl) aniline or p,p'-bis(2-hydroxyethylamino)diphenylmethane.

The epoxy resins may also be derived from mononuclear phenols, as from resorcinol, 1,2-benzenediol or hydroquinone, or they are based on polynuclear phenols such as 4,4'-dihydroxybiphenyl, bis(4-hydroxyphenyl) methane, 2,2-bis(4-hydroxyphenyl)propane, 2,2-bis(3,5-dibromo-4-hydroxyphenyl)propane, 4,4'-dihydroxydiphenylsulfone, or 9,9-bis(4-hydroxyphenyl) fluorene, or on condensates of phenols with formaldehyde which are obtained under acid conditions, for example phenol novolaks.

III) Bis(N-glycidyl) compounds, obtainable typically by dehydrochlorination of the reaction products of epichlorohydrin with amines which contain two amino hydrogen atoms. These amines are typically aniline, toluidine, n-butylamine, bis(4-aminophenyl)methane, m-xylylenediamine or bis(4-methylaminophenyl)methane.

The bis(N-glycidyl) compounds, however, also include N,N'-diglycidyl derivatives of cycloalkylene ureas such as ethyleneurea or 1,3-popyleneurea, and N,N'-diglycidyl derivatives of hydantoins, typically of 5,5-dimethylhydantoin.

IV) Bis(S-glycidyl) compounds, typically bis(S-glycidyl) derivatives that are derived from dithiols such as 1,2-ethanedithiol or bis(4-mercaptomethylphenyl) ether.

V) Epoxy resins containing a radical of formula X, wherein $R_1$ and $R_3$ together are —$CH_2$—$CH_2$—and n is 0, typically bis(2,3-epoxycyclopentyl) ether, 2,3-epoxycyclopentylglycidyl ether or 1,2-bis(2,3-epoxycyclopentyloxy) ethane. Epoxy resins containing a radical of formula X, wherein $R_1$ and $R_3$ together are —$CH_2$—$CH_2$—and n is 1, is typically 3,4-epoxy-6-methylcyclohexyl-3',4'-epoxy-6'-methylcyclohexanecarboxylate.

By reason of the preparative process, the above-mentioned difunctional epoxy resins may contain minor amounts of mono- or trifunctional groups.

Diglycidyl compounds of aromatic structure are mainly used.

It is also possible to use a mixture of epoxy resins of different structure.

Trifunctional or polyfunctional epoxy resins may further be added to obtain branched products.

Suitable epoxy resins are typically:
a) liquid diglycidyl ethers of bisphenol A, e.g. Araldit®GY 240, Araldit®GY 250, Araldit®GY 260, Araldit®GY 266, Araldit®GY 2600, Araldit®MY 790;
b) solid diglycidyl ethers of bisphenol A, e.g. Araldit®GT 6071, Araldit®GT 7071, Araldit®GT 7072, Araldit®GT 6063, Araldit®GT 7203, Araldit®GT 6064, Araldit®GT 7304, Araldit®GT 7004, Araldit®GT 6084, Araldit®GT 1999, Araldit®GT 7077, Araldit®GT 6097, Araldit®GT 7097, Araldit®GT 7008, Araldit®GT 6099, Araldit®GT 6608, Araldit®GT 6609, Araldit®GT 6610;
c) liquid diglycidyl ethers of bisphenol F, e.g. Araldit®GY 281, Araldit®GY 282, Araldit®PY 302, Araldit®PY 306;
d) solid polyglycidyl ethers of tetraphenylethane, e.g. CG Epoxy Resin®0163;
e) solid and liquid polyglycidyl ethers of phenolformaldehyde novolak, e.g. EPN 1138, EPN 1139,GY 1180, PY307;
f) solid and liquid polyglycidyl ethers of o-cresolformaldehyde novolak, e.g. ECN 1235, ECN 1273, ECN 1280, ECN 1299;
g) liquid glycidyl ethers of alcohols, e.g. Shell® glycidyl ether 162, Araldit®DY 0390, Araldit®DY 0391;
h) liquid glycidyl ethers of carboxylic acids, e.g. Shell®Cardura E terephthalate, trimellitate, Araldit®PY 284;
i) solid heterocyclic epoxy resins (triglycidylisocyanurate), e.g. Araldit® PT 810;
j) liquid cycloaliphatic epoxy resins, e.g. Araldit®CY 179;
k) liquid N,N,O-triglycidyl ethers of p-aminophenol, e.g. Araldit®MY 0510;
l) tetraglycidyl-4-4'-methylenebenzamine or N,N,N',N'-tetraglycidyldiaminophenylmethane, e.g. Araldit®MY 720, Araldit®MY 721.

Particularly preferred difunctional epoxy resins are diglycidyl ethers of bisphenols, typically 2,2-bis(4-hydroxyphenyl)propane (bisphenol A), bis(4-hydroxyphenyl)sulfone (bisphenol S) or mixtures of bis(ortho-/para-hydroxyphenyl)methane (bisphenol F).

Very particularly preferred difunctional epoxy resins are the solid diglycidyl ethers of bisphenol A type, e.g. Araldit®GT 6071, GT 7071, GT 7072, GT 6097 and GT 6099, the liquid epoxy resins of the bisphenol F type, e.g. Araldit GY 281 or PY 306, the liquid glycidyl ethers of carboxylic acids, e.g. Shell®Cardura E terephthalate, trimellitate, Araldit®PY 284 and the liquid cycloaliphatic epoxy resins, e.g. Araldit®CY 179.

It is preferred to use 0.01–5 parts, more preferably 0.02–2 parts, of diepoxide, based on 100 parts of polycondensate.

Difunctional compounds of the class of the bismaleimides (BMI) according to this invention can be illustrated by the following formula (III):

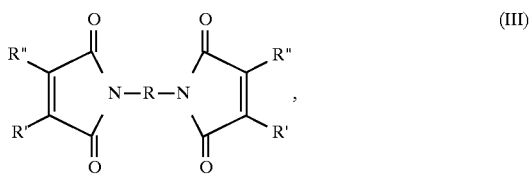

wherein R is an aliphatic, aromatic, cycloaliphatic or heterocyclic radical; and R' and R" are each independently of the other hydrogen, $C_1$–$C_4$alkyl, $C_1$–$C_6$alkoxy, phenyl or phenyloxy.

The aliphatic, aromatic, cycloaliphatic or heterocyclic radicals contain a maximum of 40 carbon atoms. These radicals may be unsubstituted or substituted and may also be interrupted by —O—, —S—, —$(CH_2)_{1-6}$—, —C(O)—, —P(O)($C_1$–$C_{18}$alkyl)— or —(O)S(O)— (signifying the radical

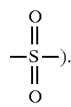

Typical examples of possible substituents are: $C_1$–$C_{18}$alkyl, $C_1$–$C_{18}$alkoxy, OH, phenyl and phenyloxy.

R defined as an aliphatic radical is typically a $C_1$–$C_{18}$polymethylene radical which may be derived from alkyl radicals such as methyl, ethyl, n-propyl, n-butyl, sec-butyl, tert-butyl, n-hexyl, n-octyl, 2-ethylhexyl, n-nonyl, n-decyl, n-undecyl, n-dodecyl, n-tridecyl, n-tetradecyl, n-hexadecyl or n-octadecyl as well as from further branched isomers.

R defined as an aromatic radical is typically a radical containing 6–40 carbon atoms, e.g. phenylene, biphenylene, or naphthylene, or is a phenylene or biphenylene radical linked through one of the groups such as —O—, —S—, —$(CH_2)_{1-6}$—, —C(O)—, —P(O)($C_1$–$C_{18}$alkyl)— or —(O)S(O)—.

R defined as a cycloaliphatic radical is typically a radical containing 5–10 carbon atoms, e.g. cyclopentylene, cyclohexylene or cyclooctylene.

R defined as a heterocyclic radical is typically a N-containing 5- or 6-membered ring such as pyridylene, pyridazylene or pyrazolylene.

R is preferably an aromatic radical of one of the formulae:

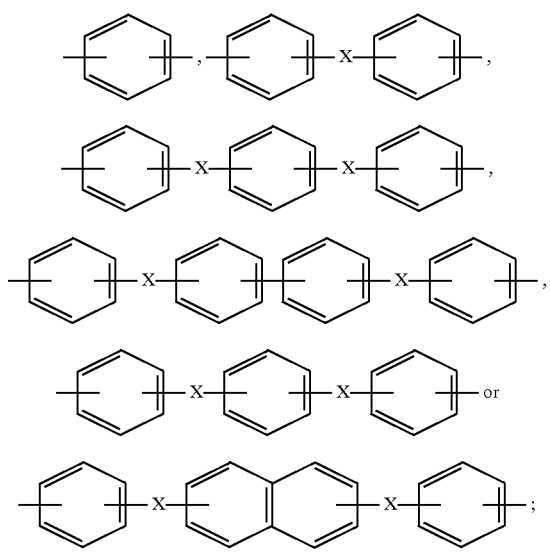

wherein X is one of the radicals —CH$_2$—, —C(O)—, —P(O)(C$_1$-C$_{18}$alkyl)—, —(O)S(O)—, —O— or —S—.

R' and R" are preferably each independently of the other hydrogen or C$_1$–C$_4$alkyl. More preferably, R' is hydrogen and R" is hydrogen or methyl. The most preferred meaning of R' and R" is hydrogen.

Very particularly preferred compounds are those of formula

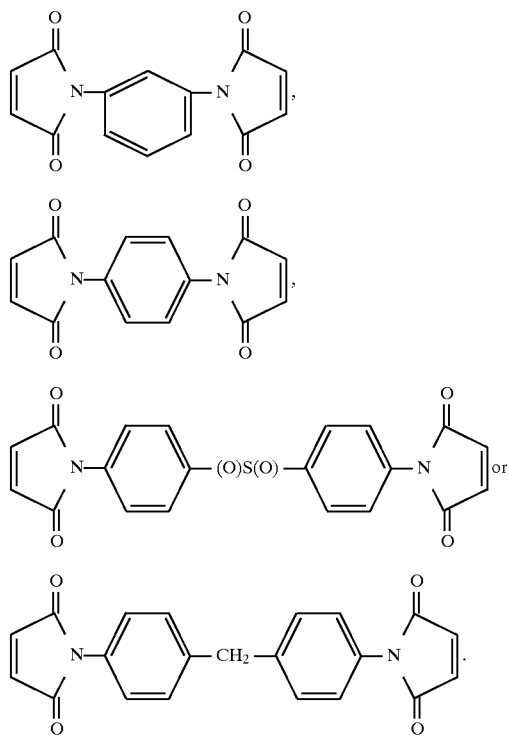

It is preferred to use 0.01–5 parts, more preferably, 0.02–2 parts, of bismaleinimide, based on 100 parts of polycondensate.

Difunctional compounds of the class of the tetracarboxylic dianhydrides according to this invention are those of formula

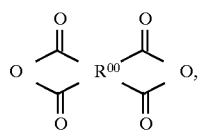

wherein R°° is a radical of formulae (Va)–(Vl)

   (Va)

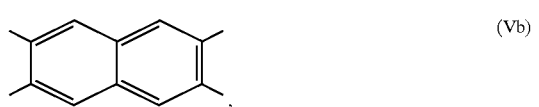   (Vb)

   (Vc)

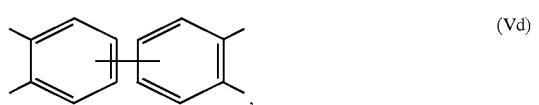   (Vd)

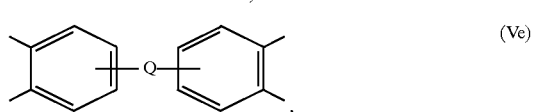   (Ve)

   (Vf)

   (Vg)

   (Vh)

   (Vi)

   (Vj)

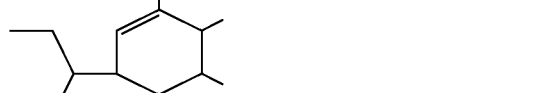   (Vk) or

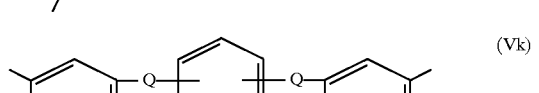

(Vl)

wherein Q is —CH$_2$—, —CH(CH$_3$)—, —C(CH$_3$)$_2$—, —C(CF$_3$)$_2$—, —S—, —O—, —(O)S(O)—, —NHCO—, —CO— or —P(O)(C$_1$-C$_{20}$alkyl)—, and the aromatic rings in formulae (Va)–(Ve) and (Vk) are unsubstituted or substituted by one or more than one $C_1$–$C_6$alkyl group, $C_1$–$C_6$alkoxy group or halogen atom.

The preferred tetracarboxylic dianhydrides are those containing aromatic rings.

It is also possible to use a mixture of tetracarboxylic dianhydrides of different structure.

It is preferred to use 0.01–5 parts, more preferably 0.02–2 parts and, most preferably, 0.05–1 part, of tetracarboxylic dianhydride, based on 100 parts of polycondensate.

Difunctional compounds of the class of the bisoxazolines according to this invention can be illustrated by formula

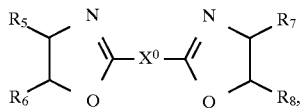

wherein $R_5$, $R_6$, $R_7$ and $R_8$ are each independently of one another hydrogen, halogen, alkyl, cycloalkyl, aryl, alkoxy or carboxyalkyl, and $X°$ is an unsubstituted or substituted aromatic radical. $X°$ is preferably a benzene or naphthalene radical.

It is preferred to use 0.01–5 parts, more preferably 0.02–2 parts, of bisoxazoline, based on 100 parts of polycondensate.

Difunctional compounds of the class of the bisoxazines according to this invention may be illustrated by formula

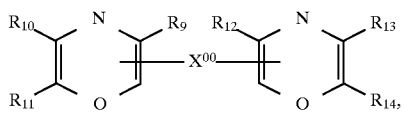

wherein $R_9$, $R_{10}$, $R_{11}$, $R_{12}$, $R_{13}$ and $R_{14}$ are each independently of one another hydrogen, halogen, alkyl, cycloalkyl, aryl, alkoxy or carboxyalkyl, and $X°°$ is an unsubstituted or substituted aromatic radical. $X°°$ is preferably a benzene or naphthalene radical.

It is preferred to use 0.01–5 parts, more preferably 0.02–2 parts, of bisoxazine, based on 100 parts of polycondensate.

Difunctional compounds of the class of the bisacyl lactams according to this invention can be illustrated by formula

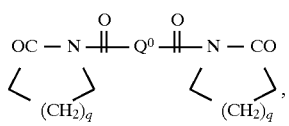

wherein q is 1 or 2, and $Q°$ is an aromatic radical, typically one of the formulae:

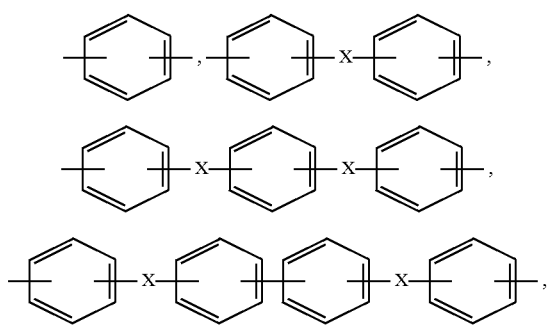

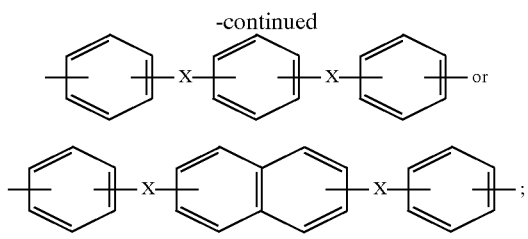

Wherein X is one of the radicals —$CH_2$—, —C(O)—, —P(O)($C_1$–$C_{18}$alkyl)—, —(O)S(O), —O— or —S—.

It is preferred to use 0.01–5 parts, more preferably 0.02–2 parts, of bisacyl lactam, based on 100 parts of polycondensate.

Difunctional compounds of the class of the diisocyanates according to this invention can be illustrated by formula $$O=C=N-R_{15}-N=C= \quad (IX),$$

wherein $R_{15}$ is $C_{1-C20}$alkylene or polymethylene, arylene, aralkylene or cycloalkylene.

Preferred diisocyanates are tetramethylenediisocyanate, hexamethylenediisocyanate, dodecamethylenediisocyanate, eicosane-1,20-diisocyanate, 4-butylhexamethylenediisocyanate, 2,2,4- or 2,4,4-trimethylhexamethylenediisocyanate, OCN(CH$_2$)$_2$O(CH$_2$)$_2$NCO, toluene-2,4-diisocyanate, p-phenylenediisocyanate, xylylenediisocyanates, 3-isocyanatomethyl-3,5,5,5-triethylcyclohexylisocyanate, naphthalenediisocyanates, sulfonyldiisocyanates, 3,3'-, 4,4'- and 3,4'-diisocyanates of diphenylmethane, 2,2-diphenylpropane and diphenyl ether, 3,3'-dimethyl-4,4'-diisocyanatodiphenyl, 3,3'-dimethoxy-4,4'-diisocyanatodiphenyl and 4,4'-diisocyanatodiphenylmethane. Diisocyanates of aromatic structure are particularly preferred.

However, it is also possible to use diisocyanate generators such as polymeric urethanes, uretidione dimers and higher oligomers, cyanurate polymers, urethanes and polymeric urethanes of cyanurate polymers and thermally dissociable adducts of Schiff's bases.

It is preferred to use 0.01–5 parts, more particularly 0.02–2 parts, of diisocyanate, based on 100 parts of polycondensate.

It is also possible to use a mixture of different difunctional compounds, preferably a mixture of difunctional epoxy resins and diisocyanates.

In addition to the diphosphonite and the difunctional compound further stabilisers may be added to the polycondensate. These further stabilisers are known to the skilled person and are selected according to the specific demands made of the end product. In particular, it is possible to add light stabilisers or also antioxidants or additional antioxidants ("Plastics Additives Handbook", Ed. R. Gächter and H. Müller, Hanser Verlag, 3rd edition, 1990; in particular pages 88/89, 92,94, 251/252 and 258,259). Likewise it is possible to add further modifiers, such as slip agents, mould release agents, impact strength improvers, fillers or reinforcing agents such as glass fibres, flame retardants, antistatic agents and, especially for PBT/PC recyclates, modifiers that prevent transesterification during processing.

Particularly suitable stabilisers include:

1. Antioxidants 1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4, 6-dimethylphenol, 2,6-dioctadecyl-4-methylphenol, 2,4,6-tricyclohexylphenol, 2,6-di-tert-butyl-4-methoxymethylphenol, 2,6-dinonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-didodecylthiomethyl-4-nonylphenol.

1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl) adipate.

1.4 Chroman derivatives of formula

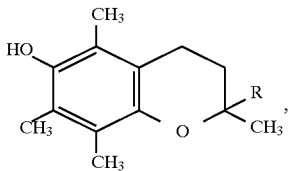

wherein R is

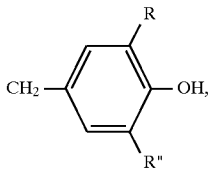

hydrogen, methyl or tert-butyl, e.g. α-tocopherol, β-tocopherol, γ-tocopherol, δ-tocopherol and mixtures thereof (vitamin E).

1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl) disulfide.

1.6. Alkylidenebisphenols, for example 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(β,β-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl) butyrate], bis(3-tert-butyl-4-hydroxy-5-methyl-phenyl) dicyclopentadiene, bis[2-(3'-tert-butyl-2'-hydroxy-5'-methylbenzyl)-6-tert-butyl-4-methylphenyl]terephthalate, 1,1-bis(3,5-dimethyl-2-hydroxyphenyl)butane, 2,2-bis(3,5-di-tert-butyl-4-hydroxyphenyl)propane, 2,2-bis(5-tert-butyl-4-hydroxy-2-methylphenyl)-4-n-dodecylmercaptobutane, 1,1,5,5-tetra(5-tert-butyl-4-hydroxy-2-methylphenyl)pentane.

1.7. O—, N— and S—-benzyl compounds, for example 3,5,3',5'-tetra-tert-butyl-4,4'-hydroxy-dibenzyl ether, octadecyl-4-hydroxy-3,5-dimethylbenzylmercaptoacetate, tris(3,5-di-tert-butyl-4hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzylmercaptoacetate.

1.8. Hydroxybenzylated malonates, for example dioctadecyl-2,2-bis(3,5-di-tert-butyl-2-hydroxybenzyl) malonate, dioctadecyl-2-(3-tert-butyl-4-hydroxy-5-methylbenzyl)malonate, didodecylmercaptoethyl-2,2-bis(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl)malonate.

1.9. Aromatic hydroxybenzyl compounds, for example 1,3,5-tris(3,5-di-tert-butyl-4hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.10. Triazine compounds, for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4hydroxyphenoxy)-1,2,3-triazine, 1,3,5-tris-(3,5-di-tert-butyl-4-hydroxybenzyl)isocyanurate, 1,3,5-tris(4-tert-butyl-3-hydroxy-2,6-dimethylbenzyl) isocyanurate, 2,4,6-tris(3,5-di-tert-butyl-4-hydroxyphenylethyl)-1,3,5-triazine, 1,3,5-tris(3,5-di-tert-butyl-4hydroxyphenylpropionyl)hexahydro-1,3,5-triazine, 1,3,5-tris(3,5-dicyclohexyl-4-hydroxybenzyl)isocyanurate.

1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl-3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate. 1.13. Esters of β-(3,5-di-tert-butyl-4hydroxyphenyl)propionic acid with mono- or polyhydric alcohols, e.g. with methanol, ethanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenyl)propionic acid with mono- or polyhydric alcohols, e.g. with methanol, ethanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris (hydroxyethyl) isocyanurate, N,N'-bis-(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.15. Esters of β-(3.5-dicyclohexyl-4-hydroxyphenyl) propionic acid with mono- or polyhydric alcohols, e.g. with methanol, ethanol octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3.5-di-tert-butyl-4hydroxyphenyl acetic acid with mono- or polyhydric alcohols, e.g. with methanol, ethanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3,5-di-tert-butyl-4-hydroxyphenyl) propionic acid e.g. N,N'-bis(3,5-di-tert-butyl-4-hydroxyphenylpropionyl)hexamethylenediamine, N,N'-bis(3,5-di-tert-butyl-4-hydroxyphenylpropionyl)trimethylenediamine, N,N'-bis(3,5-di-tert-butyl-4-hydroxyphenylpropionyl)hydrazine.

Preferred antioxidants are, for example, the following:

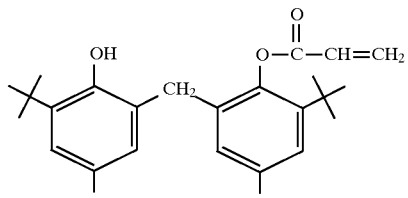

{2-(1,1-dimethylethyl)-6-[[3-(1,1-dimethylethyl)-2-hydroxy-5-methylphenyl]methyl]-4-methylphenyl 2-propenoate};

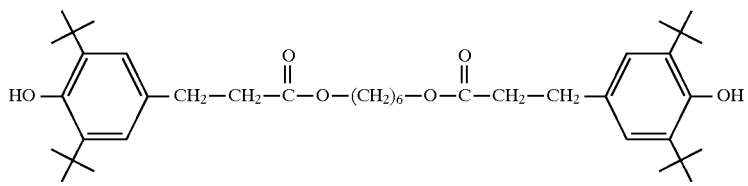

{1,6-hexandiyl 3,5-bis(1,1-dimethyl-ethyl)-4-hydroxyphenylpropanoate};

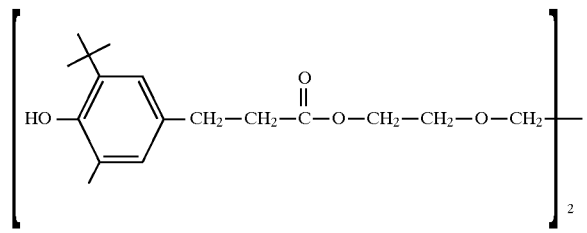

{1,2-ethanediylbis(oxy-2,1-ethanediyl) 3-(1,1-dimethylethyl)-4-hydroxy-5-methyl-phenylpropanoate};

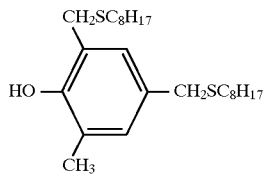

{2-methyl-4,6-bis[(octylthio)methyl]-phenol};

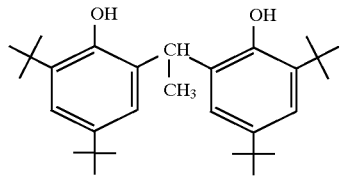

{2,2'-ethylidenebis(4,6-di-tert-butylphenol)};

-continued

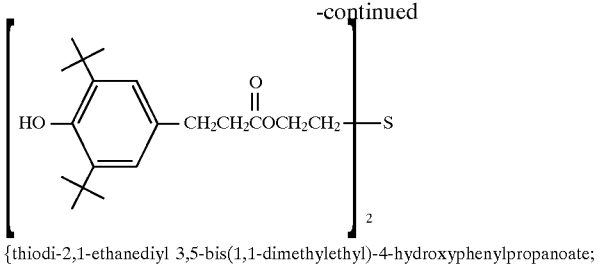

{thiodi-2,1-ethanediyl 3,5-bis(1,1-dimethylethyl)-4-hydroxyphenylpropanoate;

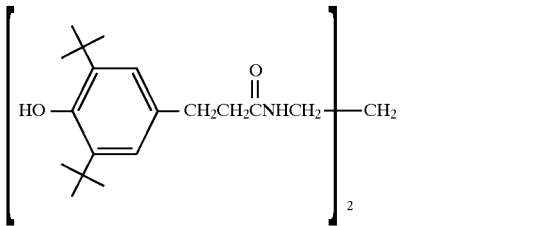

{3,5-bis(1,1-dimethylethyl)-4-hydroxy-phenylpropanoic acid methylene-dimethyleneamide};

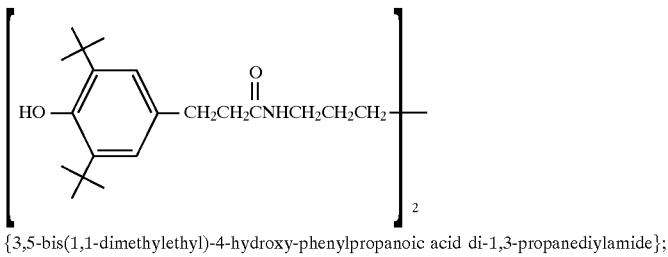

{3,5-bis(1,1-dimethylethyl)-4-hydroxy-phenylpropanoic acid di-1,3-propanediylamide};

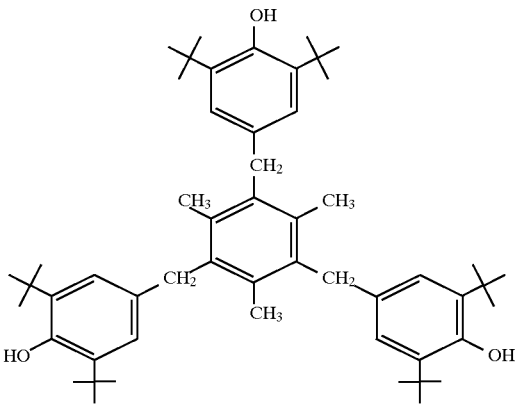

{4,4',4"-[(2,4,6-trimethyl-1,3,5-phenyltriyl)-tris(methylene)]tris[2,6-bis(1,1-dimethyl-ethyl)phenol]};

and the pentaerythrityl, octyl and the octadecyl ester of β-(3,5-di-tert-butyl-4-hydroxyphenyl)propionic acid.

2. UV absorbers and light stabilisers 2.1. 2-(2'-Hydroxyphenyl)benzotriazoles, for example 2-(2'-hydroxy-5'-methylphenyl)-benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chloro-benzotriazole, 2-(3'-tert-butyl-2'-hydroxy-5'-methylphenyl)-5-chloro-benzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis-(β,β-dimethylbenzyl)-2'-hydroxyphenyl)benzotriazole, mixture of 2-(3'-tert-butyl-2'-hydroxy-5'-(2-octyloxycarbonylethyl)phenyl)-5-chloro-benzotriazole, 2-(3'-tert-butyl-5'-[2-(2-ethylhexyloxy)-carbonylethyl]-2'-hydroxyphenyl)-5-chloro-benzotriazole, 2-(3'-tert-butyl-2'-hydroxy-5'-(2-methoxycarbonylethyl)phenyl)-5-chloro-benzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, and 2-(3'-tert-butyl-2'-hydroxy-5'-(2-isooctyloxycarbonylethyl)phenylbenzotriazole, 2,2'-methylene-bis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300; [R—CH$_2$CH$_2$—COO(CH$_2$)$_3$]$_2$, where R=(3'-tert-butyl-4'-hydroxy-5'-2H-benzotriazol-2-yl)phenyl.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, as for example 4-tert-butyl-phenyl salicylate, phenyl salicylate, octylphenyl salicylate, dibenzoyl resorcinol, bis (4-tert-butylbenzoyl) resorcinol, benzoyl resorcinol, 2,4-di-tertbutylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxycinnamate, butyl α-cyano-β-methyl-p-methoxy-cinnamate, methyl α-carbomethoxy-p-methoxycinnamate and N-(β-carbomethoxy-β-cyanovinyl)-2-methylindoline.

2.5. Nickel compounds, for example nickel complexes of 2,2'-thiobis[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenyl undecylketoxime, nickel complexes of 1-phenyl-4lauroyl-5-hydroxypyrazole, with or without additional ligands.

2.6. Sterically hindered amines, for example bis(2,2,6,6-tetramethyl-piperidyl)sebacate, bis(2,2,6,6-tetramethyl-piperidyl)succinate, bis(1,2,2,6,6-pentamethylpiperidyl) sebacate, bis(1,2,2,6,6-pentamethylpiperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, the condensate of N,N'-bis(2,2,6,6-tetramethyl-4-piperidyl) hexamethylenediamine and 4-tert-octylamino-2,6-dichloro-1,3,5-triazine, tris(2,2,6,6-tetramethyl-4-piperidyl) nitrilotriacetate, tetrakis(2,2,6,6-tetramethyl-4- piperidyl)-1,2,3,4-butane-tetracarboxylate, 1,1'-(1,2-ethanediyl)bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazasprio[4.5]decane-2,4-dione, bis(1-octyloxy-2,2,6,6-tetramethylpiperidyl) sebacate, bis(1-octyloxy-2,2,6,6-tetramethylpiperidyl) succinate, the condensate of N,N'-bis(2,2,6,6-tetramethyl-4-piperidyl)hexamethylenediamine and 4-morpholino-2,6-dichloro-1,3,5-triazine, the condensate of 2-chloro-4,6-bis (4-n-butylamino-2,2,6,6-tetramethylpiperidyl)-1,3,5-triazine and 1,2-bis(3-aminopropylamino)ethane, the condensate of 2-chloro-4,6-di(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl) pyrrolidine-2,5-dione.

2.7. Oxamides, for example 4,4'-dioctyloxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide and mixtures of ortho- and paramethoxy-disubstituted oxanilides and mixtures of o- and p-ethoxy-disubstituted oxanilides.

2.8. 2-(2-Hydroxyphenyl)-1.3.5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis (2,4-dimethylphenyl)-1,3,5-triazine, 2-[2-hydroxy-4-(2-hydroxy-3-butyloxy-propoxy)phenyl]-4,6-bis(2,4-dimethyl)-1,3,5-triazine, 2-[2-hydroxy-4-(2-hydroxy-3-octyloxy-propyloxy)phenyl]-4,6-bis(2,4-dimethyl)-1,3,5-triazine.

3. Metal deactivators, for example N,N'-diphenyloxamide, N-salicylal-N'-salicyloyl hydrazine, N,N'-bis(salicyloyl) hydrazine, N,N'-bis(3,5-di-tert-butyl-4-hydroxyphenylpropionyl) hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl) oxalyl dihydrazide, N,N'-bis(salicyloyl)thiopropionyl dihydrazide.

4. Phosphites and Phosphonites, for example triphenyl phosphite, diphenyl alkyl phosphites, phenyl dialkyl phosphites, tris(nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, bis(2,4-di-tert-butylphenyl) pentaerythritol diphosphite, bis(2,6-di-tert-butyl-4-methylphenyl)pentaerythritol diphosphite, bis(isodecyloxy) pentaerythritol diphosphite, bis(2,4-di-tert-butyl-6-methylphenyl)pentaerythritol diphosphite, bis(2,4,6-tris (tert-butylphenyl)pentaerythritol diphosphite, tristearyl sorbitol triphosphite, 6-isooctyloxy-2,4,8,10-tetra-tert-butyl-12H-dibenz[d,g]-1,3,2-dioxaphosphocin, 6-fluoro-2,4,8,10-tetra-tert-butyl-12-methyl-dibenz[d,g]-1,3,2-dioxaphosphocin, bis(2,4-di-tert-butyl-6-methylphenyl) methylphosphite, bis(2,4-di-tert-butyl-6-methylphenyl) ethylphosphite.

The following phosphites are particularly preferred:

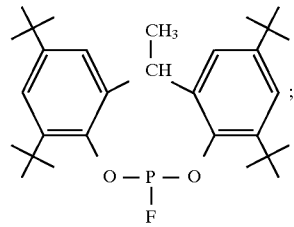

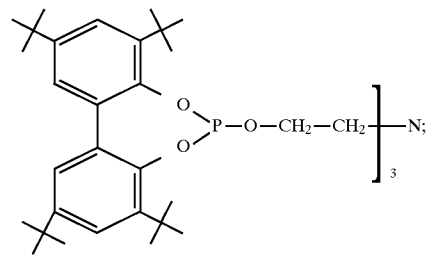

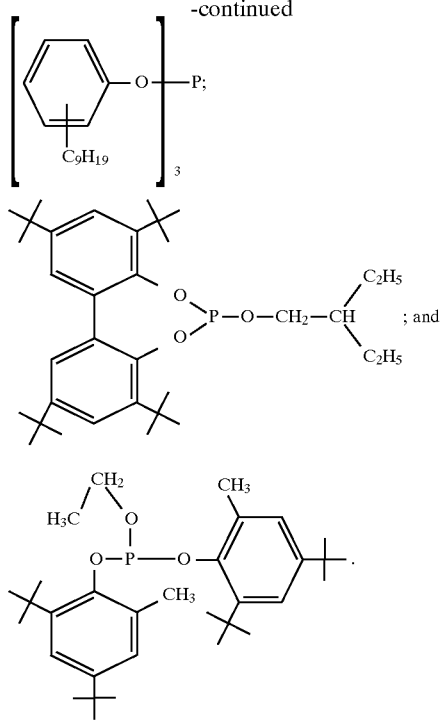

5. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecylmercapto)propionate.

6. Polyamide stabilisers, for example, copper salts in combination with iodides and/or phosphorus compounds and salts of divalent manganese.

7. Basic co-stabilisers, for example, melamine, polyvinylpyrrolidone, dicyandiamide, triallyl cyanurate, urea derivatives, hydrazine derivatives, amines, polyamides, polyurethanes.

8. Nucleating agents, for example, 4-tert-butylbenzoic acid, adipic acid, diphenylacetic acid, sodium benzoate and aluminium-bis-4-(1,1-dimethylethyl)benzoatehydroxide.

9. Fillers and reinforcing agents, for example, silicates, glass fibres, glass beads, talc, kaolin, mica, barium sulfate, metal oxides and hydroxides, carbon black, graphite.

10. Other additives, for example, plasticisers, lubricants, emulsifiers, pigments such as titanium dioxide, fluorescent whitening agents, flameproofing agents, antistatic agents, blowing agents and, in the case of recyclate blends, in particular compatibilisers, typically copolymers, more particularly block copolymers of styrene with butadiene or of styrene, butadiene and acrylonitrile. These may be copolymers of ethylene and propylene and may contain a third monomer component, e.g. butadiene. Suitable compatibilisers are also chlorinated polyethylene or ethylene vinylacetate copolymers, depending on the respective composition of the recyclate. Further suitable compatibilisers contain, in particular, polar groups and are e.g. maleic anhydride styrene copolymers or graft polymers containing acrylic acid groups. The polymeric compatibilisers are usually used in amounts of 2–20% by weight, based on the plastic to be stabilised.

Further additives for epoxy resins are the compounds customarily used for curing epoxy resins, e.g. carboxylic anhydrides, polyamines, polythiols, tertiary amines.

11. Benzofuranones and indolinones, for example those disclosed in U.S. Pat. No. 4,325,863, U.S. Pat. No. 4,338,244 or U.S. Pat. Nos. 5,175,312, 5,216,052, 5,252,643, DE-A-4 316 611, DE-A-4 316 622, DE-A-4 316 876, EP-A-0 589 839 or EP-A-0 591 102, or 3-[4-(2-acetoxyethoxy)phenyl]-5,7-di-tert-butyl-benzofuran-2-one, 5,7-di-tert-butyl-3-[4-(2-stearoyloxyethoxy)phenyl] benzofuran-2-one, 3,3'-bis[5,7-di-tert-butyl-3-(4-[2-hydroxyethoxy]-phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butyl-benzofuran-2-one, 3-(3,5-dimethyl-4-pivaloyloxyphenyl)-5,7-di-tert-butyl-benzofuran-2-one.

The preferred light stabilisers are those of the classes 2.1, 2.6 and 2.7 such as light stabilisers of the Chimassorb® 944, Chimassorb® 119, Tinuvin® 234, Tinuvin® 312, Tinuvin® 622 or Tinuvin® 770 type. Aromatic phosphites or phosphonites are also preferred.

The process can be carried out in any heatable container equipped with a stirrer, e.g. in a closed apparatus such as a kneader, mixer or stirred vessel. The process is preferably carried out in an extruder or in a kneader. It is immaterial whether processing takes place in an inert atmosphere or in the presence of oxygen.

The polycondensate material to be heated and the diphosphonite or the mixture of diphosphonite and difunctional compound are usually put into the apparatus at the start of the process. However, a subsequent addition to the polycondensate is also possible. The individual components may also be added in any order. Heating to above the melting point or glass transition temperature is usually effected, with stirring, until the diphosphonite or the mixture of the diphosphonite and the difunctional compound is homogenised. The temperature is governed by the polycondensate employed. In the case of crystalline polycondedates, processing is preferably carried out in the temperature range from melting point to c. 50° C. above the melting point. If the polycondensates are amorphous, processing is carried out in the temperature range from c. 50° C. to 150° C. above the respective glass transition temperature.

Suitable temperatures are, for example, for:

| | |
|---|---|
| PA-6 | (230–270° C.); |
| PA-6.6 | (260–300° C.); |
| PBT | (230–280° C.); |
| PET | (260–310° C.); |
| PBT/PC | (230–280° C.); and |
| PC | (260–320° C.) |

For this addition, the diphosphonite and the difunctional compound may be each independently of the other in the form of liquid, powder, granules or in compacted form or also on a substrate such as silica gel, or together with a polymer powder or wax, e.g. a polyethylene wax, but also in the form of a masterbatch.

It is preferred to add, per 100 parts of polycondensate, 0.01 to 5 parts of a diphosphonite, or 0.01 to 5 parts of a diphosphonite and 0.01 to 5 parts of a difunctional compound. It is particularly preferred to add, per 100 parts of polycondensate, 0.05 to 2 parts of diphosphonite, or 0.05 to 2 parts of diphosphonite and 0.1 to 5 parts of difunctional compound. It is very particularly preferred to add, per 100 parts of polycondensate, 0.1 to 1 part of diphosphonite, or 0.1 to 1 part of diphosphonite and 0.1 to 1 part of difunctional compound. The amount of diphosphonite and difunctional compound will depend on the initial molecular weight of the polymer and on the desired final molecular weight. Thus, when using a severely damaged polycondensate, i.e. one having a low molecular weight, it is preferred to use diphosphonite or a mixture of diphosphonite and the difunctional compound in the upper weight region. But if only a low increase in molecular weight or if only processing stabilisation is desired, then it is preferred to use diphosphonite or a mixture of diphosphonite and the difunctional compound in low concentration.

If the polycondensate is a recyclate, then this may also be used blended with virgin material or together with virgin material, typically in a coextrusion process. Blends may typically comprise one component consisting of virgin material and the other of recyclate. A stabilisation/increase in the molecular weight may in this case be carried out independently of each other.

This invention also relates to the use of a diphosphonite for increasing the molecular weight of virgin polyamide or virgin polyester, polyamide recyclates or polyester recyclates. The preferred embodiments of the use correspond to those of the process.

In another of its aspects, the invention relates to the use of a mixture comprising a diphosphonite and a difunctional compound selected from the class of the diepoxides, bismaleimides, tetracarboxylic dianhydrides, bisoxazolines, bisoxazines, bisacyl lactams and diisocyanates for increasing the molecular weight of virgin polyamide, virgin polyester or virgin polycarbonate, or polyamide recyclates, polyester recyclates or polycarbonate recyclates. The preferred embodiments of the use correspond to those of the process.

The invention also relates to a mixture comprising a polycondensate, a diphosphonite and a difunctional compound selected from the class of the diepoxides, bismaleimides, tetracarboxylic dianhydrides, bisoxazolines, bisoxazines, bisacyl lactams and diisocyanates. The preferred embodiments of the mixtures correspond to those of the process.

The invention is illustrated by the following non-limitative Examples in which and in the remainder of the description, unless otherwise stated, parts and percentages are by weight.

EXAMPLE 1–7

In a Brabender plastograph equipped with a W 50 mixing chamber, polyamide 6 (Durethan® B30 S, supplied by Bayer; predried overnight at 80° C. in a vacuum drying oven), is kneaded under nitrogen at 235° C. and 40 rpm over 30 minutes and the torque is determined. Subsequently the melt volume rate (MVR) is determined. The values listed in Table 1 are obtained.

TABLE 1

Increase in molecular weight of polyamide

| | Irgafos PEPQ (parts per 100 parts of polymer) | Difunct. cmpd (parts per 100 parts of polymer) | | Torque after 10 or 30 min. [Nm] | | MVR [cm³/ 10 min] |
|---|---|---|---|---|---|---|
| Ex. 1 | 1.0 | Irgafos PEPQ | — | — | 5.1 | 7.2 | 14.2 |
| 2 | 2.0 | " | — | — | 5.2 | 14.2 | 7.6 |
| 3 | 1.0 | " | 1.0 | epoxide 1 | 8.6 | 11.0 | 5.9 |
| 4 | 1.0 | " | 1.0 | epoxide 2 | 20.8 | 24.0 | 6.0* |
| 5 | 0.5 | " | 0.5 | epoxide 3 | 9.4 | 14.7 | n.d. |
| 6 | 2.0 | " | 2.0 | epoxide 1 | 13.1 | 20.6 | n.d. |
| 7 | 0.5 | " | 0.5 | BMI 1 | 8.3 | 9.1 | n.d. |
| V1 | — | — | — | — | 3.7 | 4.0 | 44.5 |
| V2 | — | — | 1.0 | epoxide 1 | 6.3 | 5.6 | 18.7 |

*: at 235° C./10 kg; n.d.: not determined

The increase of the torque and the decrease of the melt volume rate (determined in general accordance with ISO 1133; 235° C./2.16 kg) show a marked increase in molecular weight in the samples of Examples 1 to 7, treated according to the practice of this invention, over the comparison Examples (V1 and V2).

EXAMPLE 8:

In a Brabender plastograph equipped with a W 50 mixing chamber, a PBT/PC blend (Pocan®, supplied by Bayer) is kneaded at 235° C. and 46 rpm over 30 minutes, and the melt volume rate is determined in general accordance with ISO 1133; 235° C./2.16 kg.

When 0.25% of Irgafos PEPQ and 0.5% of p-phenylenebisoxazoline are added to the blend, the MVR value is 9.2 cm³/10 min. Without additives, a MVR value of 10.5 cm³/10 min. is obtained. The initial value is 10.0 cm³/10 min.

EXAMPLES 9–41

In general accordance with Examples 1 to 7, Durethan B 30 S is kneaded in air at 235° C. and 40 rpm over 30 minutes, and the torque and the MVR are then determined in general accordance with ISO 1133; 235° C./2.16 kg.

| Examples | Irgafos PEPQ | Difunct. compound (epoxide) | Torque [Nm] after 10 | 30 min | MVR (235° C./2.16 kg) [cm³/10 min] |
|---|---|---|---|---|---|
| 9 | 3.00 Irg. PEPQ | — | 4.9 | 20.7 | 2.3 |
| 10 | 0.50 Irg. PEPQ | 0.5 Araldit GT 6084 | 4.2 | 6.8 | 9.3 |
| 11 | 1.00 Irg. PEPQ | 1.0 Araldit GT 6084 | 4.6 | 8.3 | 6.2 |
| 12 | 0.25 Irg. PEPQ | 0.25 Araldit PY 306 | 6.0 | 9.3 | 9.6 |
| 13 | 0.50 Irg. PEPQ | 0.50 Araldit PY 306 | 7.2 | 10.3 | 5.6 |
| 14 | 1.00 Irg. PEPQ | 1.00 Araldit PY 306 | 15.7 | 23.5 | 2.0 |
| 15 | 0.25 Irg. PEPQ | 1.00 Araldit PY 306 | 16.0 | 16.8 | 2.2 |
| 16 | 0.10 Irg. PEPQ | 1.00 Araldit PY 306 | 14.4 | 14.7 | 3.8 |

| | | | | | | |
|---|---|---|---|---|---|---|
| 17 | 1.00 Irg. PEPQ | 1.00 Araldit CY 179 | | 9.9 | 11.2 | 6.6 |
| 18 | 1.00 Irg. PEPQ | 0.50 Araldit CY 179 | | 5.2 | 8.3 | 10.7 |
| 19 | 0.50 Irg. PEPQ | 1.00 Araldit CY 179 | | 9.2 | 10.2 | 7.9 |
| 20 | 2.00 Irg. PEPQ | 0.50 Araldit CY 179 | | 6.1 | 13.5 | 6.6 |
| 21 | 0.10 Irg. PEPQ | 0.10 Araldit PY 284 | | 3.4 | 5.1 | 14.3 |
| 22 | 0.25 Irg. PEPQ | 0.25 Araldit PY 284 | | 4.1 | 6.3 | 11.0 |
| 23 | 0.50 Irg. PEPQ | 0.50 Araldit PY 284 | | 5.1 | 8.1 | 7.5 |
| 24 | 1.00 Irg. PEPQ | 1.00 Araldit PY 284 | | 8.0 | 10.0 | 5.8 |
| 25 | 2.00 Irg. PEPQ | 0.50 Araldit PY 284 | | 4.7 | 13.8 | 4.7 |

| | | Difunct. compound | | Torque after [Nm] | | MVR (235° C./2.16 kg) |
|---|---|---|---|---|---|---|
| Examples | Irg. PEPQ | (epoxy resin) | Further additives | 10 min | 30 min | [cm$^3$/10 min] |
| 26 | 1.00 Irg. PEPQ | 1.00 Araldit PY 306 | 0.25% Irgafos 168 | 15.3 | 21.8 | 1.9 |
| 27 | 1.00 Irg. PEPQ | 1.00 Araldit PY 306 | 0.25% Irganox 3114 | 14.3 | 22.0 | 0.4 |
| 28 | 1.00 Irg. PEPQ | 1.00 Araldit PY 306 | 0.25% Irganox 1019 | 16.3 | 22.1 | 0.3 |
| 29 | 0.50 Irg. PEPQ | 0.50 Araldit GT 6071 | 0.25% Irgafos 12 | 5.1 | 10.0 | 5.1 |
| 30 | 0.50 Irg. PEPQ | 0.50 Araldit GT 6071 | 0.25% Z-1 | 5.1 | 10.7 | 4.6 |
| 31 | 0.50 Irg. PEPQ | 0.50 Araldit PY 306 | 0.25% dicyandiamide | 8.8 | 13.2 | 3.1 |
| 32 | 0.50 Irg. PEPQ | 0.50 Araldit PY 306 | 0.125% Irganox B 225 0.100% CaO 0.025% calcium stearate | 6.3 | 10.3 | 4.6 |
| 33 | 0.50 Irg. PEPQ | 0.50 Araldit PY 306 | 0.25% Z-2 | 7.4 | 9.6 | 4.9 |
| 34 | 0.25 Irg. PEPQ | 0.25 Araldit PY 306 | 0.25% Irganox 1098 | 5.1 | 7.5 | 8.7 |
| 35 | 0.25 Irg. PEPQ | 0.25 Araldit PY 306 | 0.25% Irganox 1098 0.25% Tinuvin 622 | 5.1 | 7.3 | 8.9 |
| 36 | 0.5 Irg. PEPQ | 0.5% Araldit PY 306 0.25% Epiclone B 4400 | | 7.7 | 9.3 | 4.7 |

| | | | | Torque after [Nm] | | MVR (235° C./2.16 kg) |
|---|---|---|---|---|---|---|
| Examples | Irg. PEPQ | Difunct. compound | Further additives | 10 min | 30 min | [cm$^3$/10 min] |
| 37 | 1.0 Irg. PEPQ | 1.0% p-phenylenebisoxazoline | — | 6.3 | 11.8 | 3.4 |
| 38 | 0.5 Irg. PEPQ | 0.5% p-phenylenediisocyanate | — | 5.5 | 6.8 | 9.8 |
| 39 | 0.5 Ing. PEPQ | 1.0% p-phenylenediisocyanate | — | 6.0 | 7.4 | 8.6 |
| 40 | 1.0 Irg. PEPQ | 1.0% p-phenylenediisocyanate | — | 6.7 | 9.4 | 6.3 |
| 41 | 0.5 Irg. PEPQ | 0.5% p-phenylenediisocyanate 0.5 Araldit PY 306 | — | 11.2 | 16.3 | 2.0 |

EXAMPLE 42

COMPARISON EXAMPLE 3

In general accordance with Examples 1–7, filled polyamide 6 (Durethan B/BKV 30 H; containing 30% of glass fibres) is kneaded at 235° C. and 40 rpm over 30 minutes. The torque is 17.3 Nm (without additives: 9.9) after 30 min and with the addition of 1.0% of Irgafos PEPQ and 1% of Araldit PY 306. The MVR value (235° C./2.16 kg) is 2.5 cm$^3$/10 min (without additives: 3.8 cm$^3$/10 min).

EXAMPLE 42

COMPARISON EXAMPLE 4

Polyamide 6 damaged by storing in water (10 weeks/80° C.) is compounded, after drying overnight at 80° C. in a vacuum drying oven, on a twin-screw extruder (CW 100, supplied by Haake) at 240° C. Test samples are prepared from the extrudate at 250° C. on an injection moulding machine type Arburg 221 and, inter alia, the mechanical properties are determined in the freshly moulded state.

| | DIN 53455 | | | DIN 53448 |
|---|---|---|---|---|
| | Tensile strength [N/mm$^2$] | Tear resistance [%] | ISO 180/1A Impact strength notched | Tensile impact strength [kJ/m$^2$] |
| Comparison Example 4 (no additives) | 78.8 | 30.3 | 8.9 | 208 |
| Example 43 (addition of 0.25% Irgafos PEPQ 0.25% Araldit GT 6071) | 78.7 | 57.9 | 10.0 | 236 |

EXAMPLE 44

COMPARISON EXAMPLE 5

Polyamide 66 scrap material (mechanically stripped, from wheel shields /30% mineral filling) is extruded, after drying overnight at 80° C. in a vacuum drying oven, on a twin-screw extruder (TW 100, supplied by Haake) at 290° C. and 30 rpm. Test samples are prepared from the extrudate at 260° C. on an injection moulding machine type Arburg 221 and, inter alia, the tensile impact strength is determined according to DIN 53448 (average of 5 samples) in the freshly moulded state.

| | Comparison Example 5 (no additives) | 365 kJ/m² |
|---|---|---|
| | Example 44 (addition of 0.25% Irgafos PEPQ 0.25% Araldit PY 306) | 430 kJ/m² |

EXAMPLE 45

COMPARISON EXAMPLE 6

PBT/PC grinding stock (production waste of car bumpers) is kneaded at 235° C. and 40 rpm over 30 minutes and, inter alia, the indicated values are determined.

| | Torque after | | MVR |
|---|---|---|---|
| | 15 min | 30 min [Nm] | (250° C./2.16 kg) [cm³/10 min] |
| Comparison Example 6 (no additives) | 3.8 | 2.6 | 29.0 |
| Example 45 (1% Irgafos PEPQ 0.25% pyromellitic dianhydride) | 3.9 | 3.6 | 17.3 |

The following compounds are used:

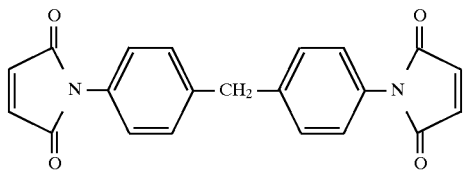

Irgafos ® 12 (ciba; CH):

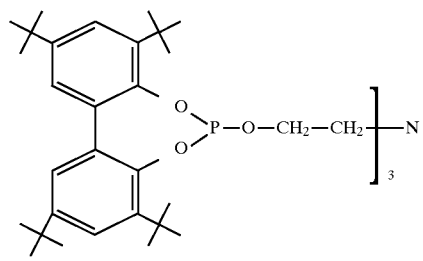

Irgafos® 168 (ciba; CH): tris(2,4-di-tert-butylphenyl) phosphite

Irganox® 225 (ciba; CH): 1:1 mixture of the pentaerythrityl ester of β-(3,5-di-tert-butyl-4-hydroxyphenyl) propionic acid and tris(2,4-di-tert-butylphenyl) phosphite Irganox® 1019 (ciba; CH): N,N'-trimethylene-bis-3-(3,5-di-tert.-butyl-4-hydroxyphenyl)-propionate Irganox® 1098 (ciba; CH): N,N'-hexamethylene-bis-3-(3,5-di-tert.-butyl-4-hydroxyphenyl)-propionate Irganox® 3114 (ciba; CH): 1,3,5-tris(3',5'-di-tert.-butyl-4'-hydroxybenzyl)-isocyanurate Tinuvin® 622 (ciba; CH): polymer of butanedioic acid with 4-hydroxy-2,2,6,0-tetramethylpiperidine ethanol Z1: 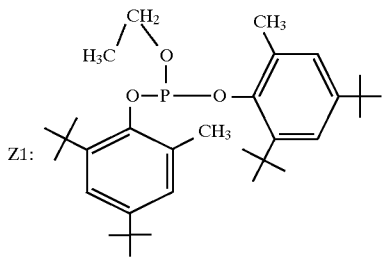

Z2: bis(2,6-diisopropylphenyl)carbodiimide

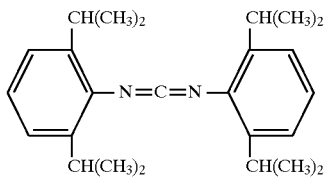

What is claimed is:

1. A process for increasing the molecular weight of polycondensates, essentially without crosslinking, which comprises heating a polyamide, a polyester, a polycarbonate, or a copolymer or a blend of these polymers, with the addition of at least one diphosphonite and at least one difunctional compound selected from the group consisting of the diepoxides, bismaleimides, tetracarboxylic dianhydrides, bioxazolines, bisoxazines, bisacyl lactams and diisocyanates to above the melting point (in the case of crystalline polycondensate types) or to above the glass transition temperature (in the case of amorphous polycondensate types) of the polymer.

2. A process according to claim 1, wherein the polycondensate is a polycondensate recyclate.

3. A process according to claim 1, wherein the diepoxide is a compound containing epoxy radicals of formula (II)

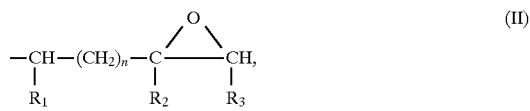

which radicals are linked direct to carbon, oxygen, nitrogen or sulfur atoms, wherein $R_1$ and $R_3$ are both hydrogen, $R_2$ is hydrogen or methyl, and n=0, or wherein $R_1$ and $R_3$, taken together, are —$CH_2$—$CH_2$— or —$CH_2$—$CH_2$—$CH_2$—, in which case $R_2$ is hydrogen and n=0 or 1.

4. A process according to claim 1, wherein the bismaleimide is a compound of formula (III)

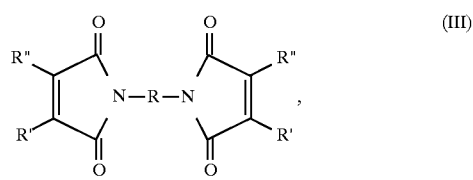

wherein R is an aliphatic, aromatic, cycloaliphatic or heterocyclic radical; and R' and R" are each independently of the other hydrogen, $C_1$–$C_4$alkyl, $C_1$–$C_6$alkoxy, phenyl or phenyloxy.

5. A process according to claim 1, wherein the tetracarboxylic dianhydride is a compound of formula (IV)

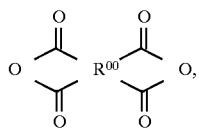

wherein R°° is a radical of formulae (Va)–(Vl)

(Va) 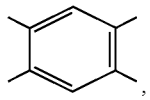

(Vb) 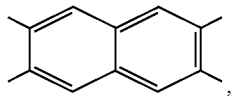

(Vc) 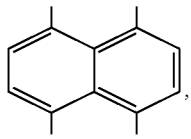

(Vd) 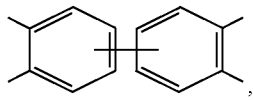

(Ve) 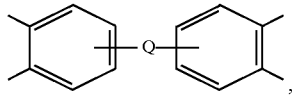

(Vf) 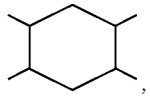

(Vg) 

(Vh) 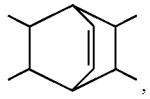

(Vi) 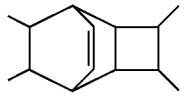

(Vj) 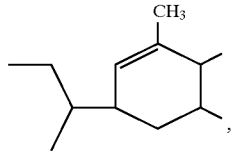

(IV)

-continued (Vk) 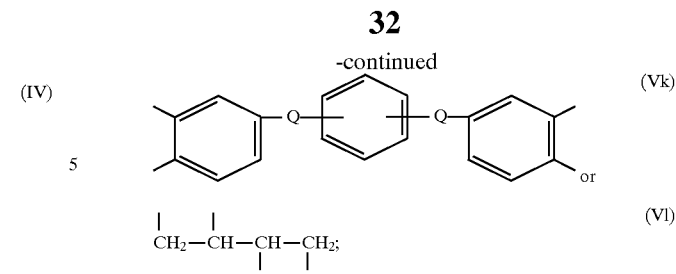

or (Vl)

CH$_2$—CH—CH—CH$_2$;

wherein Q is —CH$_2$—, —CH(CH$_3$)—, —C(CH$_3$)$_2$—, —C(CF$_3$)$_2$—, —S—, —O—, —(O)S(O)—, —NHCO—, —CO— or —P(O)(C$_1$–C$_{20}$alkyl)—, and the aromatic rings in formulae (Va)–(Ve) and (Vk) are unsubstituted or substituted by one or more than one C$_1$–C$_6$alkyl group, C$_1$–C$_6$alkoxy group or halogen atom.

6. A process according to claim 1, wherein the bisoxazoline is a compound of formula (VI)

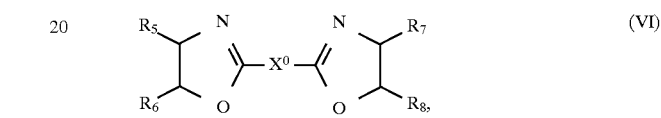 (VI)

wherein R$_5$, R$_6$, R$_7$ and R$_8$ are each independently of one another hydrogen, halogen, alkyl, cycloalkyl, aryl, alkoxy or carboxyalkyl, and X° is an aromatic radical.

7. A process according to claim 1, wherein the bisoxazine is a compound of formula (VII)

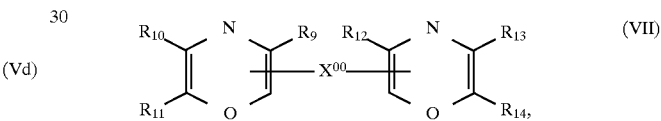 (VII)

wherein R$_9$, R$_{10}$, R$_{11}$, R$_{12}$, R$_{13}$ and R$_{14}$ are each independently of one another hydrogen, halogen, alkyl, cycloalkyl, aryl, alkoxy or carboxyalkyl, and X°° is an aromatic radical.

8. A process according to claim 1, wherein the bisacyl lactam is a compound of formula (VIII)

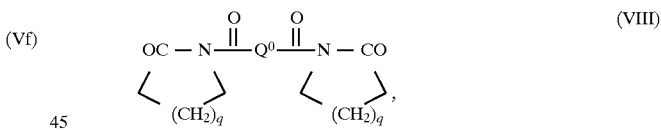 (VIII)

wherein q is 1 or 2, and Q° is an aromatic radical of the formulae:

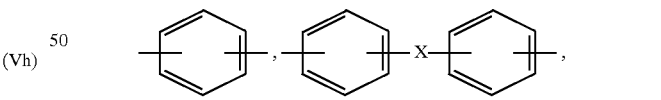

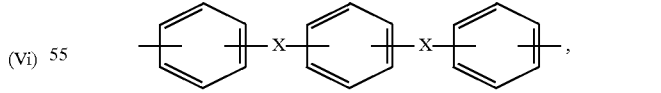

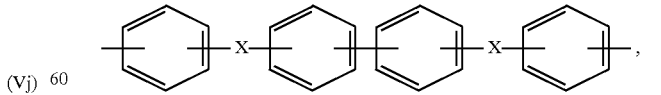

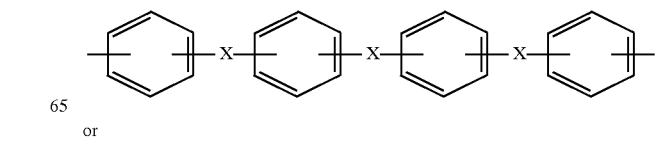

or

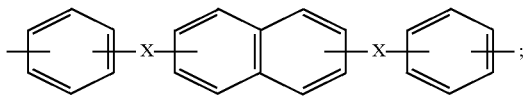

wherein X is one of the radicals —CH$_2$—, —C(O)—, —P(O)(C$_1$–C$_{18}$alkyl)—, —(O)S(O)—, —O— or —S—.

9. A process according to claim 1, wherein the diisocyanate is a compound of formula (IX)

 (IX)

wherein R$_{15}$ is C$_1$–C$_{20}$alkylene or polymethylene, arylene, aralkylene or cycloalkylene.

10. A process according to claim 1, which comprises adding 0.01 to 5 parts of the diphosphonite and 0.01 to 5 parts of the difunctional compound per 100 parts of polycondensate.

11. A process according to claim 1 wherein the polycondensate used is a poly(butylene terephthalate) polycarbonate blend or a blend containing mainly poly(butylene terephthalate)/polycarbonate or a corresponding recyclate or a blend of a recyclate and a virgin plastic.

12. A process according to claim 1, wherein the polycondensate used is a polycarbonate or a corresponding recyclate or a blend of a recyclate and a virgin plastic.

13. A process according to claim 1, wherein the polycondensate used is a poly(ethylene terephthalate) or a corresponding recyclate or a blend of a recyclate and a virgin plastic.

14. A mixture comprising a diphosphonite, a difunctional compound selected from the group consisting of the diepoxides, bismaleimides, tetracarboxylic dianhydrides, bioxazolines, bisoxazines, bisacyl lactams and diisocyanates, and a virgin polycondensate or polycondensate recyclate or a mixture of a recyclate and a virgin plastic.

15. A polycondensate obtained according to a process as claimed in claim 1.

16. A process according to claim 1, wherein the diphosphonite is a compound of formula

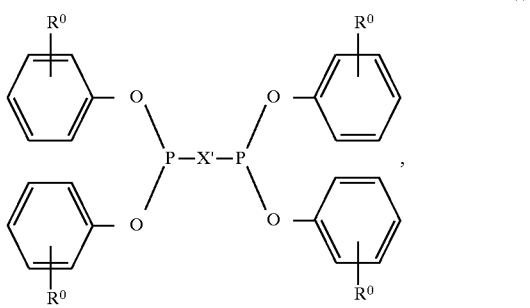 (I)

wherein R° is one to five C$_1$–C$_8$alkyl radicals; X'is a radical

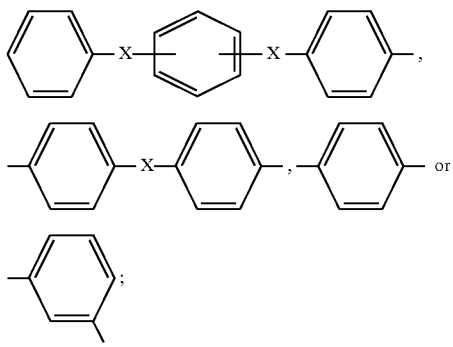

and X is a direct bond, —(O)S(O)—, —C(O)—, —S—, —O— or arylene.

* * * * *